July 3, 1962 F. T. GEYLING 3,041,923
STRESS PHOTOMETER
Filed Dec. 14, 1959 2 Sheets-Sheet 1

INVENTOR
F. T. GEYLING
BY *Roy M. Porter Jr.*
ATTORNEY

July 3, 1962 F. T. GEYLING 3,041,923
STRESS PHOTOMETER
Filed Dec. 14, 1959 2 Sheets-Sheet 2
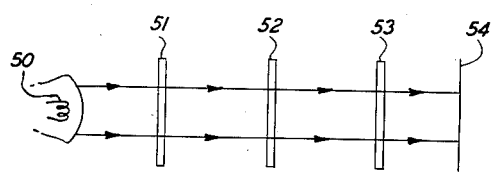
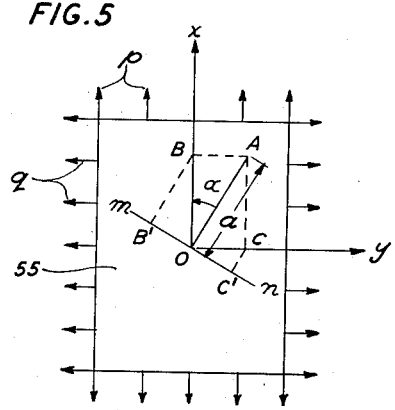
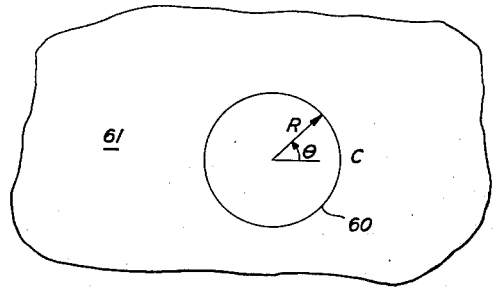
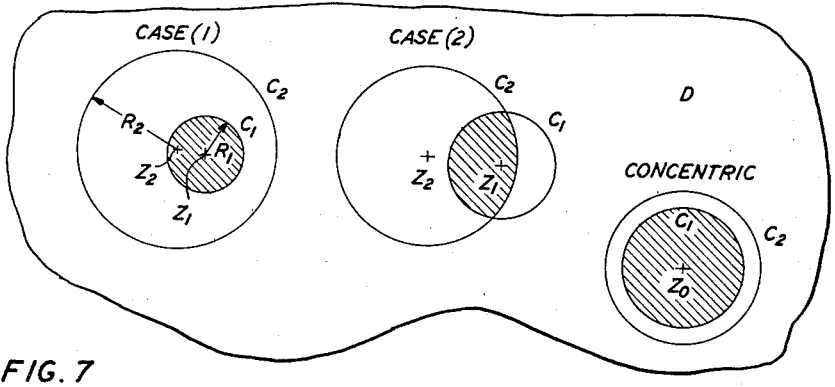
INVENTOR
F. T. GEYLING
BY
ATTORNEY

United States Patent Office 3,041,923
Patented July 3, 1962

3,041,923
STRESS PHOTOMETER
Franz T. Geyling, Summit, N.J., assignor to Bell Telephone Laboratories, Incorporated, New York, N.Y., a corporation of New York
Filed Dec. 14, 1959, Ser. No. 859,183
3 Claims. (Cl. 88—14)

This invention relates to the art of measuring the stresses in materials or structures and, more particularly, to methods and means adapted for use with photoelastic stress patterns in the determination of such stresses.

When external loads are applied to a solid body such as a structural part of a machine, forces called stresses are set up within the body. The magnitude and direction of these stresses vary from point to point within the body, and are dependent upon the particular loads applied and upon the shape of the stressed body. At certain points the stresses are concentrated, and these points are potential weak spots at which the structure may fail under loaded operating conditions. Oftentimes critical stress concentrations may be eliminated by a change in the shape of the structural member without detracting from its utility. Thus it becomes desirable to know the stress distribution of any given structural member under load and also how this stress distribution will be modified by a change in the shape of the member.

For the simplest distribution of forces upon a member of regular geometric shape, the mathematical theory of elasticity may yield a complete solution of the internal stresses. When however, the member is of irregular shape and/or the applied forces have a complex distribution, other modes of stress determinations are required. One such method, which is both economical and relatively rapid, and which yields full information is the photoelastic method of stress analysis.

The photoelastic method involves the examination in polarized light of a model of the structure whose stresses are to be investigated, the material of the model being generally a clear plastic selected to have special optical properties. When the model is placed under a load system identical with that to be applied to the structure of interest, and the stressed body is illuminated and observed in the proper polarizations, a pattern of optically observable bands or fringes having different light intensity is formed. From a visual observation of the fringes, a qualitative determination of the relative stresses involved can be obtained. From a more detailed observation of the fringes, a determination of the actual stress values within the model can be obtained. By analogy, then, the stresses in the actual structure of interest may be ascertained. It is toward the determination of actual stress values that the present invention is directed.

The particular method chosen for determining the actual stress values from the available photoelastic data is also determinative of the nature and quantity of data required. Thus, the character of the means by which data is gathered for use in the chosen method is fixed once the method is chosen. It is in conjunction with a new mathematical method of stress calculation from photoelastic data that the present invention has particular utility.

In this mathematical method, point readings of light intensity are utilized in the calculations. Accordingly, an essential part of a photoelastic system to be utilized in the determination of stress values according to the new method is a device capable of scanning a photoelastic fringe pattern and measuring light intensity values at various points therein. Such a device will be designated herein as a photometer or, more specifically, a scanning stress photometer. When the photometer is especially tailored for use with the chosen method of mathematical calculation, the stress determination process is greatly facilitated.

It is therefore an object of the present invention to facilitate the gathering and interpretation of light intensity data from a photoelastic model under stress.

It is a further object of the invention rapidly to gather data which is particularly suited for use with a new mathematical method of stress calculation.

A more specific object of the invention is to gather photoelastic data along curves describing circles of adjustable radius about fixed points on the image of a stressed photoelastic model.

In accordance with the invention, light intensity sensing means are disposed within a housing capable of movement along a rectilinear path, the housing being itself mounted within a member which is attached to a shaft capable of rotary motion about its longitudinal axis, the line of the axis passing through one extremity of the rectilinear path.

In a principal embodiment of the invention, a semitransparent or translucent, circular screen having a narrow slit along a selected radius is attached to a hollow cross member positioned to overlay the region including the slit. The cross member and screen assembly is rotatably mounted on a cylindrical shaft on which is attached a circular disc having graduations in degrees of rotation about its circumference. A light intensity sensing device is mounted on a threaded spindle within the hollow cross member positioned such that its light admitting aperture travels along the slit in the translucent screen as the spindle is rotated. By means of a manual rotation of the assembly about the cylindrical shaft, light intensity readings about a circular path of any desired radius within the limit of the size of the device may be obtained.

The above and other objects, the nature of the present invention, and its various features and advantages will appear more fully upon consideration of the illustrative embodiments shown in the accompanying drawing and described in detail hereinbelow.

In the drawing:

FIG. 4 is a schematic illustration of a plane polariscope;

FIG. 5, given by way of explanation, illustrates geometrical relationships involved in the polariscope of FIG. 4; and FIGS. 6 and 7 are illustrative of the geometries involved in a new mathematical method of stress calculation.

Figure 1:
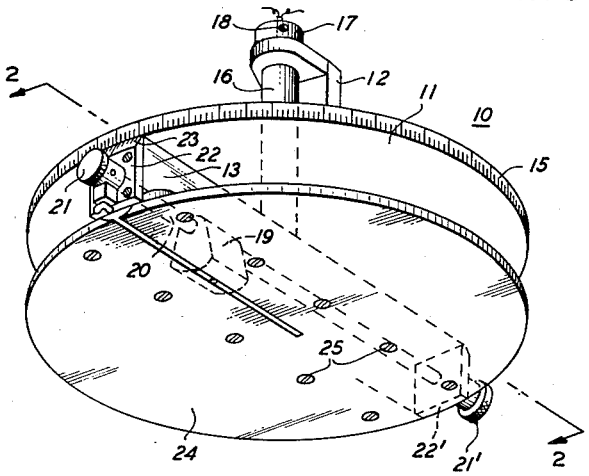
FIG. 1 is a perspective view of a stress photometer in accordance with the invention.

Referring more particularly to the drawing, there is shown in FIG. 1 a perspective view of a stress photometer 10 comprising circular metallic disc 11 and supporting bracket 12 serving as a turntable about which hollow cross bar 13 and a translucent circular screen rotate. Disc 11 provides a fixed reference with respect to which the rotation of the cross member 13 takes place. Disc 11 which has a thickness of the order of one-quarter inch may comprise the commercial alloy sold under the trademark Dural, which is a combination of aluminum, copper, magnesium, and manganese or it may comprise some similar material. Likewise, all other component parts of the photometer, unless specified otherwise, may comprise Dural. The circumferential surface 15 of disc 11 carries thereon a scale in rotational degrees, with graduations to one degree. Extending through an aperture at the center of disc 11 is hollow shaft 16, which is fastened to cross member 13 by means of screw threads. Shaft 16 extends through apertures at the bottom and the top of bracket 12 and is secured from separating from the bracket by means of collar 17 and set screw 18, all of which will be explained in greater detail below with reference to FIG. 2. Hollow cross member 13, which is free to rotate about disc 11 contains phototransistor housing 19 mounted upon a threaded spindle 20 which terminates at its ends in knobs 21, 21'. The extremities of member 13 are closed by face plates 22, 22' which carry on their upper beveled surfaces a ±10 place vernier scale 23 positioned adjacent to the degree scale on disc 11. Attached to the lower surface of member 13 is screen 24 which may comprise a synthetic plastic composed of polymerized tetrafluorethylene sold commercially under the trademark Teflon, or some similar translucent material on which an optical pattern may be cast with resultant resolution visible to a human observer. Screen 24 contains a single radial slit positioned at the center of member 13 and engages such member by means of a plurality of threaded machine screws 25.

Figure 2:
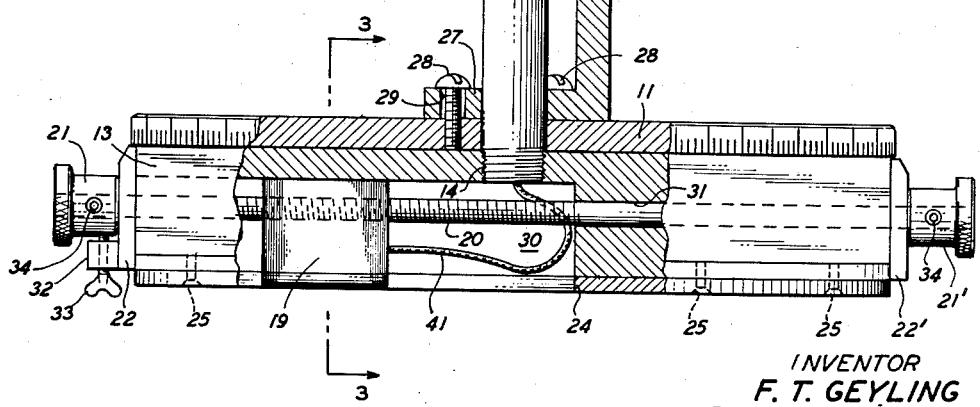

A more complete comprehension of the construction of the device may be afforded by reference to FIG. 2, which is a partial sectional view of the photometer of FIG. 1 taken at line 2—2. In FIG. 2 hollow shaft 16 is seen to extend through apertures in circular disc 11 and top and bottom flanges 26, 27 of bracket 12. The upper portion of member 13 contains an aperture at its center threaded to receive threads 14 of the lower extremity of the shaft. The upper extremity of shaft 16 extends through collar 17 which is secured to the shaft by set screw 18. When screw 18 is tightened against the shaft, the latter member is prevented from slipping out of bracket 12. Thus, when the assembly comprising member 13 and shaft 16 is rotated with respect to disc 11 and bracket 12, collar 17 rotates in similar fashion. Bracket 12 is atatched to disc 11 by means of threaded machine screws 28 which extend through holes 29 in bracket 12 into disc 11 which is tapped to receive them. Holes 29 are designed with play space in order that shaft 16 be free to rotate without binding against bracket 12. The apertures in disc 11 and bracket 12 through which shaft 16 extends are machined to a slide fit, thereby permitting free relative rotational motion between the components. Cross member 13, which is of substantially rectangular transverse cross section contains hollow chamber 30, which extends approximately sixty percent of the longitudinal length of the member, and occupies about seventy-five percent of its volume along this extent. Member 30 is terminated at its extremities by face plates 22, 22' carrying at their upper edges vernier scales as mentioned above. Extending successively through an aperture in face plate 22, the chamber 30, a hole 31 in member 13, and an aperture in face plate 22' is threaded spindle 20. The ends of spindle 20 are provided with knobs 21, 21' with knurled surfaces for easy manual rotation. Each knob is attached to the spindle by a set screw 34. Extending outward from plate 22 is tapped flange 32 through which wing headed set screw 33 extends to engage the surface of knob 21. Set screw 33 is tightened against the knob to prevent random rotation of spindle 20 after it has been properly positioned. Engaging spindle 20 on a threaded aperture therein is phototransistor housing 19. When spindle 20 is rotated by means of knobs 21, 21', the longitudinal position of housing 19 with respect to member 13 is changed. Thus housing 19 may be positioned at any desired location between the center and extremity of member 13. Attached to the lower surface of member 13 by means of machine screws 25 is screen 24. The relative construction of member 13, housing 19, and screen 24 will be more apparent from reference to FIG. 3, which is a partial view in cross section taken at line 3—3 of FIG. 2.

Figure 3:
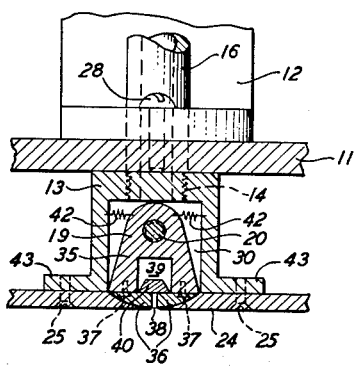
FIGS. 2 and 3 are sectional views of the photometer of FIG. 1.

In FIG. 3, a portion of shaft 16 is illustrated extending through bracket 12 and disc 11, the latter two elements being joined by machine screw 28. Shaft 16 is fastened by its threaded extremity 14 to member 13 which in turn carries screen 24 on its lower surface. Member 13 is of rectangular transverse cross section with the lower surfaces thereof terminating in flanges 34 with which machine screws 25 engage. The lower three-fourths of member 13 comprises chamber 30 within which housing 19, supported on threaded spindle 20, is positioned. Housing 19 which may be constructed of brass, comprises three parts. The upper portion 35 of housing 19 has an external shape in the form of an inverted U extending from the top chamber 30 to its lower surface. Fastened to the bottom of upper portion 35 are two covering slugs 36 held in fixed relation to portion 35 by machine screws 37. The lower surfaces of slugs 36 form a portion of a circular arc which is seated in a hollowed out portion of screen 24 in the vicinity of slit 38. Slugs 36 are spaced apart a distance of the order of 1/32 inch at slit 38. Thus an aperture for admitting light rays into the interior of housing 19 is formed. A small rectangular cavity 39 extends within housing 19 immediately adjacent slit 38. Within this cavity a light sensing device 40, such as for example a well-known phototransistor, is disposed with its light intensity senser positioned at the slit 38. Extending from the rear of housing 19, and connected electrically to sensing device 40 is lead 41, as shown in FIG. 2. Lead 41 extends through chamber 30 and passes upward through hollow shaft 16 to emerge for connection to appropriate electrical measuring instruments, not shown. In FIG. 3, when spindle 20 is rotated housing 19 travels therealong within chamber 30, its upper edge making a sliding contact with the upper surface of the chamber, and its lower edge sliding in the circular seat or fillet in screen 24. In order to prevent excessive lateral movement of the housing as it advances along spindle 20, anti-backlash springs 42 may be provided between housing 19 and the walls of chamber 30.

In the operation of a photometer in accordance with the invention, an image of the photoelastic pattern associated with the model under stress is cast upon the translucent screen of the device. Then, in accordance with the mathematical method to be set out hereinafter, point readings of light intensity are taken, as the phototransistor, positioned at the desired radius along its enclosing member, sweeps out a circular path about the fixed axis of rotation of the photometer. Discrete measuring intervals are assured by reference to the graduations in degrees on backplate 11 and the vernier scales on cross member 13. By adjusting the physical location of the center of the image screen, and by virtue of the combined radial and rotary motions provided by the photometer, any point on the image of the stressed body may be selected for observation.

In order to appreciate fully the utility of the photometer disclosed above, an understanding of the interrelation between the photoeleastic data gathered by the device and the mathematical method which utilizes such data to determine actual stress values is necessary.

By way of introduction it may be stated that with the advent of photoelastic methods of increased precision and the use of high-speed digital computers, it appears that photoelasticity may become one of the leading techniques for obtaining detailed stress distributions with rapidity and accuracy. Such calculations require the use of a large amount of experimental data which may be coded onto punched cards, and fed into a programmed computer which has an output the valves of the stresses at every point where this information is required.

The program for the computer should use a method of calculation which is efficient from the standpoint of minimizing the number of experimental observations. It is also desirable that the accuracy of the results should not be limited by inherent inaccuracies in the method of calculation. For example, one commonly used method, the so-called "shear-difference" method, requires numerical differentiation of the experimental data, a process which tends to magnify the effect of experimental error.

In searching for improved methods of calculation, treatment of the plane elastic problem by complex variable techniques was selected. These techniques have been greatly advanced during the past fifty years and their use in the evolved method is a formal shorthand which gives insight into the problem to be solved. In complex form the problem of stress determination reduces to the simple application of the Cauchy integral theorem on circular contours. The result is a formula for the sum of the principal stresses in terms of integrals of the experimental data over one or more circles.

Thus, to state the most practical use of the method concisely, having measured the values of principal stress difference and principal angle at discrete points on the circumference of each of a pair of concentric circles, the sum of the principal stresses up to a constant, and thus the stresses themselves, may be determined everywhere within the smaller circle. The circle-pairs may be of any size and position in the interior of the region to be observed; obviously they may be chosen to cover the region in an optimum fashion with respect to number and precision of experimental observations. The integration constant, which must be evaluated to arrive at actual stress values, may be determined from knowledge of the resultant force on some part of the boundary of the stressed region, obtained, for example, by measuring the force on the loading fixture. The present method completely avoids the necessity of numerical differentiation at the cost of slight additional mathematical complexity. While this added complexity would be a handicap in the case of hand calculation, it is negligible when machine calculation is employed.

As an introduction to the details of the mathematical method, a brief discussion of the fundamental characteristics of the photoelastic method appears appropriate. FIG. 4 represents, in diagrammatic form, a plane polariscope, or photoelastic stress analysis apparatus. A beam of light originating at light source 50 passes through a plate 51 which polarizes the light such that transverse vibrations occur in a predominant direction. This polarized light passes through the photoelastic model 52 and subsequently through a second plate 53, called an analyzer, which has a polarization plane normal to that of plate 51 but is in all other respects similar thereto. The light beam in the form of bands of light of varying intensity called interference fringes is then incident upon screen 54, which corresponds to screen 24 of the stress photometer of FIGS. 1-3. Proceeding now to an investigation of the behavior of the polarized light upon incidence on model 52, FIG. 5 represents an element 55 of the face of element 52 upon which light from polarizer 51 is incident, the directions of the principal stresses $p$, $q$ being selected vertical and horizontal, respectively, for convenience. A ray of light polarized in the plane OA is incident upon the element, the direction of propagation of the ray being normal to the plane of the paper. Light ray vibrations are simple harmonic in nature and may be represented by a transverse displacement of $s=a \cos \omega t$ in the direction OA, where $\omega$ is $2\pi$ times the frequency (which depends upon the color of the incident light), and $t$ is time. The maximum displacement $a$ in the vibration plane may be resolved into two components along the direction of the principal stresses, $$OB = a \cos \alpha$$
$$OC = a \sin \alpha$$

The displacement components along $x$ may be represented as $$x = a \cos \alpha \cos \omega t$$

and the displacement component along $y$ as $$y = a \sin \alpha \cos \omega t$$

The effect of the principal stresses $p$ and $q$ acting at point O is to change the velocities with which each of the components $x$ and $y$ are propagated through the model.

When the propagation velocities are different the times for each component to pass through the model are different and, since the light rays are transmitted without change of form, the displacement $x_1$ of a light ray component leaving the plate at time $t$ corresponds to the displacement $x$ of the light entering the plate at a time $t_1$ earlier. Similarly the displacement $y_1$ of an emergent ray at time $t$ corresponds to the displacement $y$ of light entering at a time $t_2$ earlier. Thus $$x_1 = a \cos \alpha \cos \omega(t-t_1)$$
$$y_1 = a \sin \alpha \cos \omega(t-t_2)$$

On leaving the plate, therefore, the components have a phase difference $\mu$ equal to $\omega(t_2-t_1)$.

It is known that, all other considerations being equal, the resultant phase difference is proportional to the difference in the values of the principal stresses.

Polarization plate 53, which is the analyzer portion of the polariscope apparatus, transmits only those light ray components parallel to its own polarization plane. Since this polarization plane is generally normal to that of polarizer 51, represented by line $mn$ in FIG. 5, if the model 52 is removed from its position between polarizer and analyzer, no light will be transmitted by the analyzer and screen 54 will be dark. When the model is present, however, some light will be transmitted and will illuminate the screen with the well-known interference fringes. The components $x_1$, $y_1$ may be represented at the analyzer as $$x_2 = a \cos \alpha \cos \lambda$$
$$y_2 = a \sin \alpha \cos (\lambda - \mu)$$

since they retain the phase difference $\mu$ in traveling from model 52 to the analyzer. The symbol $\lambda$ has been used to denote the quantity $(\omega t + \text{constant})$. The components $OB'$ and $OC'$ are transmitted by the analyzer to the screen. These components may be expressed as $$OB' = x_2 \sin \alpha = \tfrac{1}{2} a \sin 2\alpha \cos \lambda$$

and $$OC' = -y_2 \cos \alpha = \tfrac{1}{2} a \sin 2\alpha \cos (\lambda - \mu)$$

Along $mn$ therefore the resultant vibration is $$\tfrac{1}{2} a \sin 2\alpha [\cos \lambda - \cos (\lambda - \mu)]$$

$$= -a \sin 2\alpha \sin \tfrac{\mu}{2} \sin \left(\lambda - \tfrac{\mu}{2}\right)$$

in which the factor $$\sin \left(\lambda - \tfrac{\mu}{2}\right)$$

represents simple harmonic motion of amplitude $$a \sin 2\alpha \sin \tfrac{\mu}{2}$$

Thus, some light will reach screen 54 unless either $$\sin 2\alpha = 0 \text{ or } \sin \tfrac{\mu}{2} = 0$$

If $\sin 2\alpha = 0$, the perpendicular principal stress directions are parallel to the perpendicular polarization axes of the polarizer 51 and analyzer 53. Thus, light rays which pass through such points of the model 52 will be extinguished and the corresponding points on screen 54 will be dark. Such points usually lie on curves indicated by dark bands or fringes on the screen. Such curves or bands are denoted "isoclinics." From an examination of the isoclinics of a stressed photoelastic model the principal angle $\alpha$ which the principal stress makes at any point with a given reference axis may be determined. On the other hand if $$\sin \tfrac{\mu}{2} = 0$$

then $\mu = 2n\pi$ where $n = 0, 1, 2 \ldots$, and at these points, no light will be transmitted and screen 54 will be dark.

Such dark points also lie on well defined curves or fringes and are called "isochromatics." From an examination of the isochromatics of a stressed photoelastic model, the principal stress difference, $p-q$, may be determined. Since one may determine the principal stress difference, $p-q$, and the principal angle $\alpha$ at each point of a slab of transparent, elastic material in a state of plane stress from photoelastic observations of isochromatics and isoclinics, the shear stress $\sigma_{xy}$ and the difference of the normal stresses $\sigma_{xx}$, $\sigma_{yy}$ may be calculated immediately from the relations $$2\sigma_{xy}=(p-q)\sin 2\alpha \qquad (1)$$
$$\sigma_{xx}-\sigma_{yy}=(p-q)\cos 2\alpha$$

which are obtained from elementary consideration of the equilibrium of a small triangle of material under stress.

In order to determine the actual normal stresses themselves, rather than their difference only, it is necessary either to make further experimental observations (e.g. of the thickness change of the loaded model) or to perform further calculations, using, for example, the given values of $p-q$ and $\alpha$ and the values of the stresses at one point. It is the latter problem with which the present method is concerned.

In the problems of plane stress to which the present method is applicable a slab of elastic material whose faces are free of loads and whose edge is subjected only to surface tractions in the plane of the slab with no bending moments present is considered. The stresses involved are average stresses over the slab thickness, lying in the plane of the slab and obeying the equilibrium equations $$\partial\sigma_{xx}/\partial x+\partial\sigma_{xy}/\partial y=0 \qquad (2)$$
$$\partial\sigma_{xy}/\partial x+\partial\sigma_{yy}/\partial y=0$$

These equations apply under conditions of static equilibrium, with no body forces present. In order that the elastic deformations be those which a continuous medium may undergo, the quantity $\sigma_{xx}+\sigma_{yy}$ must be a harmonic function. Since any such function may be represented by the real (or imaginary) part of an analytic function of the complex variable $z=x+iy$, the following notation may be used for the sum of principal stresses:

$$\sigma_{xy}+\sigma_{yy}=p+q=4Re\Phi(z)=2[\Phi(z)+\overline{\Phi(z)}] \qquad (3)$$

where $\Phi$ is analytic. The equilibrium equations then yield $$\sigma_{yy}-\sigma_{xx}+2i\sigma_{xy}=2[\bar{z}\Phi'(z)+\Psi(z)] \qquad (4)$$

where $\Psi$ is a second independent analytic function. This notation corresponds to that of N. I. Muskhelishvili in his publication entitled "Theory of Elasticity," P. Noordhoff, Ltd., Groningen, 1953.

Equation 1 may be written more compactly in the form $$\sigma_{yy}-\sigma_{xx}+2i\sigma_{xy}=-(p-q)e^{-2i\alpha}$$

or, using Equation 4, as $$\bar{z}\Phi'(z)+\Psi(z)=w(z) \qquad (5)$$

where the non-analytic complex function $w(z)$ is given by $$2w(z)=-(p-q)e^{-2i\alpha}$$

and may be calculated at each point of the region directly from the photoelastic data. Henceforth $w(z)$ will be regarded as known.

Equation 3 implies that, if $\Phi(z)$ were known, or at least its real part, the sum of the normal stresses, and hence the normal stresses themselves, would be determined. Thus the problem reduces to the determination of $\Phi(z)$ from Equation 5, with $w(z)$ given. Note that Equation 5 involves $\Phi'(z)$, rather than $\Phi(z)$, so that an integration constant may be expected in the course of the calculation. This integration constant or, more precisely, its real part, might, for example, be determined from given values of the shear and normal stresses at one point. The addition of an arbitrary imaginary constant to $\Phi$ obviously does not affect the state of stress. The addition of a real constant is equivalent to the imposition of a state of constant hydrostatic pressure upon the stress distribution.

Before proceeding to develop methods for the determination of $\Phi$, it should be noted that all of the following calculations depend strongly on special properties of the functions considered on circles and straight lines. This is not merely fortuitous; rather circles and straight lines are the only curves in the complex plane on which the equations reduce to tractable forms.

Single Circle Method

In FIG. 6, a diagram useful in what is perhaps the simplest technique of determining $\Phi$ is illustrated.

Equation 5 may be rewritten in the form $$(\bar{z}-\bar{z}_0)\Phi'(z)+\Psi(z)+\bar{z}_0\Phi'(z)=w(z) \qquad (6)$$

Consider the values of the above functions on the circle $60-C$: $|\zeta-z_0|=R$—where the circle and its interior lie within the region 61 in FIG. 6. Since on C $$\zeta-\bar{z}_0=R^2/(\zeta-z_0)$$

Equation 6 may be written on C as $$R^2(\zeta-z_0)^{-1}\Phi'(\zeta)+\Psi(\zeta)+\bar{z}_0\Phi'(\zeta)=w(\zeta) \qquad (7)$$

Both $\Psi(z)$ and $\bar{z}_0\Phi'(z)$ are analytic functions on C and its interior and hence contribute nothing to a contour integral of Equation 7 around C. Furthermore R is a constant, so that we find on integration, using the Cauchy integral formula, and solving for $\Phi'(z_0)$ using $\zeta=z_0+Re^{i\theta}$, $$\Phi'(z_o)=(1/2\pi R)\int_0^{2\pi}w(z_o+Re^{i\theta})e^{i\theta}d\theta$$

$\Phi'(z)$ can thus be calculated throughout the interior of region D by laying down circles of convenient size around every point at which its value is desired with the stress photometer described above and utilizing the light intensity data obtained. The function $\Phi(z)$ may then be determined, up to an integration constant, by taking a line integral along any path in the region so that $$\Phi(z)=\Phi_0+\int_0^z\Phi'(z)dz$$

where the integration constant $\Phi_0$ might be the value of $\Phi$ at the origin, taken to lie in the region. The real part of $\Phi_0$, which is all that is required, may be determined by inspection if the stresses are given at some interior point. Usually, however, the point at which the stresses are known lies on the boundary of the region. In this case $Re\Phi_0$ might be determined by extrapolation of $\Phi-\Phi_0$ to the boundary and comparison with the given value at the point.

This method uses the given data somewhat inefficiently, a set of values of $w(z)$ on a given circle being used for the determination of the value of $\Phi'(z)$ at but a single point. A method which uses the data more efficiently at the expense of slight additional complexity follows.

Two-Circle Method

Equation 7 can also be written in the form $$[R^2+\bar{z}_0(\zeta-z_0)]\Phi'(\zeta)+(\zeta-z_0)\Psi(\zeta)=(\zeta-z_0)w(\zeta)$$

If we multiply this equation by $(\zeta-z)^{-1}$, where $z$ lies within C, and integrate around C, there results $$[R^2+\bar{z}_o(z-z_o)]\Phi'(z)+(z-z_o)\Psi(z)$$
$$=(1/2\pi i)\int_C(\zeta-z_o)(\zeta-z)^{-1}w(\zeta)d\zeta$$

by the Cauchy integral formula. This relation holds on the interior of any circle $C_k$: $|\zeta-z_k|=R_k$ in the region D. In particular, as shown in FIG. 7, if two circles $C_1$, $C_2$, having some portion of their interiors in common are utilized, two independent equations for $\Phi'(z)$ and $\Psi(z)$ are obtained for values of the variable $z$ in their common region.

These equations are $$[R_k^2 + \bar{z}_k(z-z_k)]\Phi'(z) + (z-z_k)\Psi(z) = W_k \quad (8)$$

for $k=1$ and $k=2$, where $$W_k = (1/2\pi i)\int_{C_k} (\zeta - z_k)(\zeta - z)^{-1} w(\zeta) d\zeta \quad (9)$$

These equations are not solvable for values of $z$ at which they are not independent. In general, the equations are independent if the coefficient determinant $$\Delta(z) = \begin{vmatrix} R_1^2 + \bar{z}_1(z-z_1), & z-z_1 \\ R_2^2 + \bar{z}_2(z-z_1), & z-z_2 \end{vmatrix}$$

is non-vanishing. An investigation of this determinant reveals that if one circle lies entirely within the other, $\Delta(z)$ always has one zero within the smaller circle, i.e., in the region of applicability of Equation 8, and one outside, both of them lying on the line passing through points $z_1$ and $z_2$. If the two circles touch, $\Delta(z)$ has a double zero at the point of tangency and finally, if they intersect, the zeros lies at the intersection points.

The use of concentric circles $C_1$: $|\zeta - z_0| = R_1$, $C_2$; $|\zeta - z_0| = R_2$, with $R_1 < R_2$, leads to an especially simple expression for $\Phi'(z)$, namely $$\Phi'(z) = (W_2 - W_1)/(R_2^2 - R_1^2) \quad (10)$$

for $|z - z_0| < R_1$. This formula also holds at $z = z_0$. Equation 10 yields values of $\Phi'(z)$ over the entire interior of $C_1$ in the concentric circle case illustrated in FIG. 7. $\Phi(z)$ may now be computed, up to an integration constant, by evaluating a line integral on $\Phi'(z)$, given by Equation 10, over any path lying within $C_1$. If equation 10 be integrated there results $$\Phi(z) = \Phi(z_0) + (\Omega_2 - \Omega_1)/(R_2^2 - R_1^2) \quad (11)$$

with $$\Omega_k = \int_{z_0}^{z} W_k dz = (1/2\pi i) \int_{C_k} (\zeta - z_o) w(\zeta) \log[(\zeta - z_o)/(\zeta - z)] d\zeta$$

This rather simple formula for $\Phi$ itself holds all over the interior of the circle $C_1$: $|z - z_0| < R_1$. Note that for all $z$ in $C_1$, the same sets of values of $w$ and $C_1$ and $C_1$ are used. Once $w$ has been evaluated by experimental observation on a set of suitably chosen circle-pairs, covering the region, $\Phi$ may be computed directly from the above. For purposes of this calculation, the following substitutions are used:

$$\zeta = z_0 + R_k e^{i\theta}, \text{ on } C_1 \text{ and } C_2$$
$$z = z_0 + R_1 r e^{i\theta}, 0 \leq r < 1$$
$$r_1 = R_1/R_2$$

and $$w_k(\theta) = w(z_0 + R_k e^{i\theta})$$

Using the above substitutions, $$\Omega_1(r, \varphi) = -(R_1^2/2\pi)\int_0^{2\pi} e^{2i\theta} w_1(\theta) \log(1 - re^{i(\varphi-\theta)}) d\theta$$

and $$\Omega_2(r, \varphi) = -(R_2^2/2\pi)\int_0^{2\pi} e^{2i\theta} w_2(\theta) \log(1 - r_1 re^{i(\varphi-\theta)}) d\theta$$

Similar, but considerably more intricate, formulas are obtained when the circles are non-concentric. For a region of some particular shape it might be advantageous to such configurations.

The case having more complexity after circles which can be used in conjunction with the method is that of ellipses. On the ellipse E:

$$\frac{(x-x_o)^2}{a^2} + \frac{(y-y_o)^2}{b^2} = 1$$

and $\bar{z}$ is given by the following function of $z$:

$$S(z) = \bar{z}_o + (z-z_o)\frac{b^2 + a^2 - 2ab\sqrt{1-(a^2-b^2)/(z-z_o)^2}}{a^2-b^2}$$

Hence, after some manipulation, $$\int_E \frac{\Phi'(\zeta)\bar{z}_o + \Psi(\zeta)}{(\zeta-z)(\zeta-z_o)} d\zeta + \frac{b^2+a^2}{b^2-a^2}\int_E \frac{\Phi'(\zeta)}{\zeta-z} d\zeta$$
$$+ \frac{2ab}{b^2-a^2}\int_E \frac{\sqrt{1-(a^2-b^2)/(\zeta-z_o)^2}}{(\zeta-z)} d\zeta = \int_E \frac{w(\zeta) d\zeta}{(\zeta-z)(\zeta-z_o)}$$
$$(12)$$

If three confocal ellipses are chosen, then each of the three integrals on the left-hand side of Equation 12 will be the same no matter which ellipse we are on. This is true since $z_0$, the center of the ellipses, and $|a^2 - b^2|$, the square of the distance between the foci, will be the same. Hence three equations of the form of Equation 12 can be solved simultaneously for, in particular, the second integral, which equals $2\pi i \Phi'(z)$.

Thus, the use of three confocal ellipses permits the determination of $\Phi(z)$ up to a constant $\Phi(z_0)$ at any point interior to all three by forming a linear combination of $$\frac{i}{2\pi i}\int_{E_i} \frac{w(\zeta)}{\zeta - z_o} \log \frac{\zeta - z_o}{\zeta - z} d\zeta$$

as was done in Equation 11 for two circles. One advantage which the three ellipses might offer in some cases over two circles is that a larger portion of a long thin region may well be within three ellipses than within even several pairs of concentric circles.

What is claimed is:

1. In combination a solid structural body transparent to light, means for physically loading said body, means for illuminating said body with light having a given plane of polarization, an optical device having a polarization plane transverse to the light energy propagation direction and normal to said given plane positioned in the path of light transmitted through said body, and means for gathering data on circular contours from the resulting photoelastic stress pattern, said gathering means comprising a circular disc having graduations in rotational degrees marked about its periphery, a hollow cross member rotatably mounted on a shaft joining said disc at its center point, a light energy reflecting screen having a radial slit extending from its center to a point on its circumference attached to said cross member and rotatable about said shaft with said cross member, and a light intensity sensing device slidably mounted within said cross member with the light admitting aperture of said device positioned in said slit, said light sensing device being adapted for positioning at any location along said slit.

2. In combination, a source of plane polarized light, a solid stressed body disposed in the path of said light, analyzer means for transmitting only light rays having a plane of polarization normal to that of said source positioned in the path of light emerging from said body, and means for scanning over circular contours the resultant interference fringes, said last named means comprising a circular transparent screen having a narrow slit along a selected radius thereof attached to a hollow elongated member positioned to overlay said slit, a cylindrical shaft affixed to said member and extending in a direction normal to the plane of said screen at its center, a disc having a hole in the center thereof positioned on said shaft, said hole being proportioned to permit said shaft to rotate therewithin, and a photocell mounted within said hollow member at said radial slit and associated with means for positioning said cell at any location along said slit.

3. Means for scanning photoelastic stress patterns along circular contours which lie in planes transverse to the direction of propagation of the interfering light rays, said scanning means comprising a circular transparent screen having a narrow slit along a selected radius thereof attached to a hollow elongated member positioned to overlay said slit, a cylindrical shaft affixed to said member and extending in a direction normal to the plane of said screen at its center, a disc having a hole in the center thereof positioned on said shaft, said hole being proportioned to permit said shaft to rotate therewithin, and a photocell mounted within said hollow member at said radial slit and associated with means for positioning said cell at any location along said slit.

References Cited in the file of this patent

UNITED STATES PATENTS

| | | |
|---|---|---|
| 2,119,577 | Gray | June 7, 1938 |
| 2,261,192 | Townsend | Nov. 4, 1941 |
| 2,360,883 | Metcalf | Oct. 24, 1944 |
| 2,444,675 | Rath | July 6, 1948 |